A. W. HAIGH.
APPARATUS FOR RECORDING AND PROMOTING TRANSACTIONS.
APPLICATION FILED JUNE 10, 1915.
1,290,739.  Patented Jan. 7, 1919.
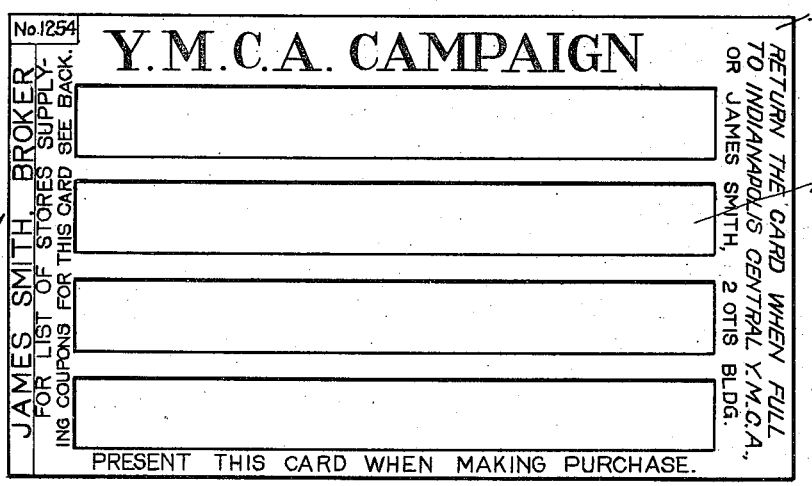
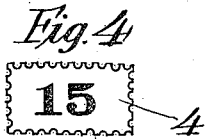
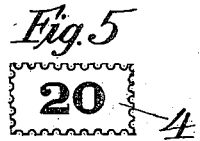
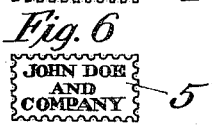
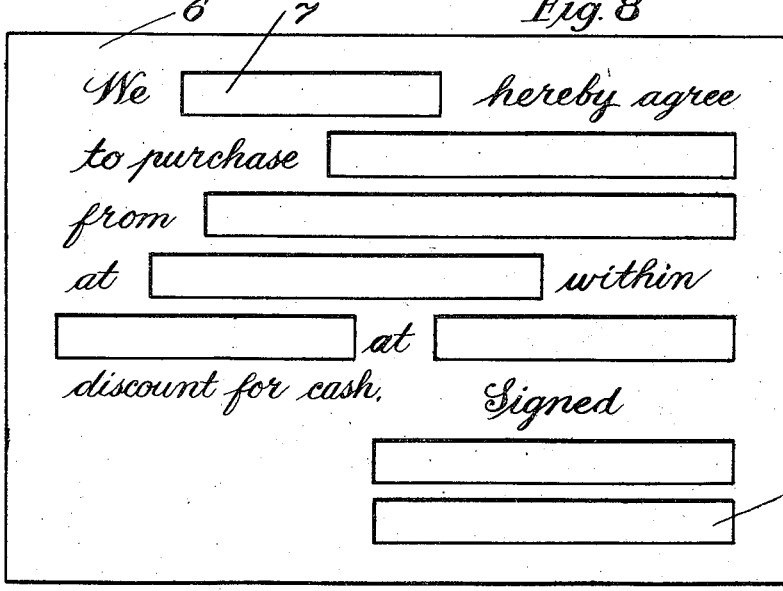

UNITED STATES PATENT OFFICE.

ALBERT W. HAIGH, OF WHITE PLAINS, NEW YORK.

APPARATUS FOR RECORDING AND PROMOTING TRANSACTIONS.

1,290,739.  Specification of Letters Patent.  Patented Jan. 7, 1919.

Application filed June 10, 1915.  Serial No. 33,222.

*To all whom it may concern:*

Be it known that I, ALBERT W. HAIGH, a citizen of the United States, residing at White Plains, in the county of Westchester and State of New York, have invented new and useful Improvements in Apparatus for Recording and Promoting Transactions, of which the following is the specification.

This invention relates to a method and apparatus for recording and promoting transactions, and particularly to apparatus divided into two parts, one of which is retained by one party to a transaction and the other by the other thereof, the uniting of the two parts of the apparatus signifying and recording the close of the transaction, the agency through which it was closed and the amount or other features involved.

It is an object of this invention to provide a method and apparatus whereby sales or other transactions may be recorded, and whereby, further, such transactions will be promoted by making it possible to award a prize or premium or pay a rebate when a certain volume of business has been done.

It is another object of this invention to provide each class of parties to transactions, with parts of the apparatus which parts may be united to make the complete recording system when each transaction has been accomplished.

It is another object of this invention to provide a method and apparatus for promoting transactions engineered by a broker, without personal attention to each transaction on the part of said broker, and to record said transactions.

In the particular modification of the invention herein disclosed I provide a system of cards, and a system of coupons designed to be attached to the cards to indicate the completion of whatever transaction is indicated by the coupons. By the use of this apparatus by the method now to be described, it is possible to promote a large volume of business and at the same time to assist some philanthropic or other movement. This may be carried out as follows: Suppose, for instance, that a Y. M. C. A. is desirous of raising money; a broker employed in putting my invention into practice is approached by it for assistance. The broken will provide the Y. M. C. A. with a large number of cards and will, thereafter, engage or make arrangements with one or more stores so that the stores will pay either directly to the Y. M. C. A. or to him for the Y. M. C. A. a certain percentage upon all purchases made at the selected stores for the purpose of the Y. M. C. A. fund-raising campaign. He then supplies the stores with coupons adapted to be attached to the cards and indicating sales of various amounts. The Y. M. C. A. distributes the cards through its boys to the purchasing members of numerous families. All purchases made at the stores which are a party to the scheme (the names of which stores will appear upon the cards, or by reference to separate list) are recorded upon the cards by the coupons given to the customers at the time of making the purchases, and upon the presentation of his card, by the stores. When the card is full it is returned to the Y. M. C. A. which, either through the broker or directly, collects from the stores a percentage upon the total amount of sales indicated upon the cards. By this means money will be raised for philanthropic purposes, stores will receive valuable advertising, their sales will be promoted and the purchasers will be called upon to contribute nothing except the time and trouble involved in putting the coupons onto the cards.

In the drawings in which I disclose one form of my invention Figure 1 is an elevation of a card such as employed by me in the manner above described.

Fig. 2 is a cross sectional view of the same.

Figs. 3, 4 and 5 represent the coupons to be used in connection with the cards, such as shown in Fig. 1.

Figs. 6 and 7 represent the form of coupons.

Fig. 8 represents the application of the system to contracts and other business forms, wherein blanks may be filled in by supplying appropriately worded coupons.

For convenience only one store has been indicated but it is to be understood that any number may participate.

The card 1 is provided with depressed portions 2 in which is gum 3, the surface of the gum being below the level of the face of the card to prevent its sticking to other cards when stacked up, or to envelops or to other surfaces. 4 represents the coupons in various amounts which are adapted to be applied to the card at the time of completing each transaction. If more than one store is involved in the scheme the coupons would be identified for each store so as to properly apportion the expense of cashing in the cards, as above described. The coupons could also bear an appropriate design such as "Y. M. C. A. campaign", or other reading matter, and the name of the broker.

In Fig. 8 is disclosed a modification of the invention adapted to be applied for other business transactions, such as selling contracts, in which large numbers of contracts are made along the same lines by the same concern such as, for instance, agency contracts or contracts of sale. In this modification each party is provided with appropriate coupons which are pasted by each into appropriate spaces upon the cards to fill out the instrument to make a complete contract. Thus in the form disclosed in Fig. 8 a blank 7 will be filled with coupons indicating the terms of sale, and the blanks 8 will be filled with coupons representing the signatures of the participants of the contract, duly authorized by their agents.

Many other modifications of the invention could, of course, be devised without departing from the scope and spirit thereof, the essential feature of the invention being the provision of a card or blank retained by one party to the transaction and of coupons supplied to the other party of a transaction, the union of the blanks and coupons indicating the completion of the particular transaction indicated by the coupons attached. It is obvious, for instance, that the invention is applicable to a transaction involving the agreement or coaction of three or more parties, one of whom will be supplied with the card and the other with different coupons, the union of the card with the various coupons indicating and recording the coaction of all the parties and the close of the transaction.

Having now described my invention:
I claim:
1. In apparatus for recording transactions brought about by a third person without the personal attendance by such third person at the closing of the same, comprising a card the surface of which is provided with depressions therein, the face of said depressions being gummed, coupons representing the amount of sales, said card to be delivered to a buying individual and said coupons to a selling individual whereby upon a sale the selling individual will issue coupons to the buying individuals to be pasted to said gummed surface which being depressed will permit said cards to be placed in contact with each other or with other papers without accidental sticking.

2. In apparatus for recording transactions between two or more parties, comprising a card for use by one of said parties and having a plurality of gummed depressions adapted to adhesively receive coupons, the gum of said depressions being below the level of the face of the card to prevent sticking when stacked, said card bearing identification of a portion of the transaction, coupons designating the amount of sales and for use by the other party, so that when the card is filled with coupons it will evidence the transaction between the parties.

3. Apparatus for recording transactions, comprising a blank having spaces thereon, coupons adapted to fill said spaces, said blank having matter thereon to indicate the general nature of the business, and the coupons indicating the particular transactions and one of the parties thereto whereby when said coupons are attached to said blank particular transactions will be recorded.

In witness whereof, I hereunto subscribe my name to this specification in the presence of two witnesses.

ALBERT W. HAIGH.

Witnesses:
S. D. HAIGHT,
RAYMOND A. DE FOREST.